United States Patent [19]

Goyat

[11] 4,232,524
[45] Nov. 11, 1980

[54] PRODUCTION OF INDUSTRIAL ELECTRICAL ENERGY FROM HYDRAULIC ENERGY

[75] Inventor: Eugène Goyat, Belley, France

[73] Assignee: Raymond Goyat, Cuzieu-Belley, France; a part interest

[21] Appl. No.: 888,031

[22] Filed: Mar. 20, 1978

[30] Foreign Application Priority Data

Mar. 24, 1977 [FR] France ............................... 77 08757

[51] Int. Cl.³ ............................................ F01K 7/32
[52] U.S. Cl. ...................................... 60/647; 60/675
[58] Field of Search ................ 60/641, 647, 651, 671, 60/675

[56] References Cited

U.S. PATENT DOCUMENTS 4,187,686  2/1980  Pommier ........................... 60/641 X

FOREIGN PATENT DOCUMENTS 2401024  7/1975  Fed. Rep. of Germany ............. 60/641
2297334  8/1976  France .
 163790  5/1921  United Kingdom ...................... 60/641

Primary Examiner—Allen M. Ostrager
Assistant Examiner—Stephen F. Husar
Attorney, Agent, or Firm—Lewis H. Eslinger

[57] ABSTRACT

A process for the production of electrical energy from a fluid circulating in a closed circuit, of the type employing a fluid brought to saturating vapor phase in a substantially vertical column, at the upper part of which the fluid is returned to liquid phase before being directed towards a fall column which it takes to return to the lower part of the first column where vaporization takes place and to actuate, between these two levels and within the fall column, at least one energy-producing member; a temperature being arranged to prevail in the vapor column which enables the vapor to be maintained close to its critical point.

6 Claims, 1 Drawing Figure

U.S. Patent
Nov. 11, 1980
4,232,524
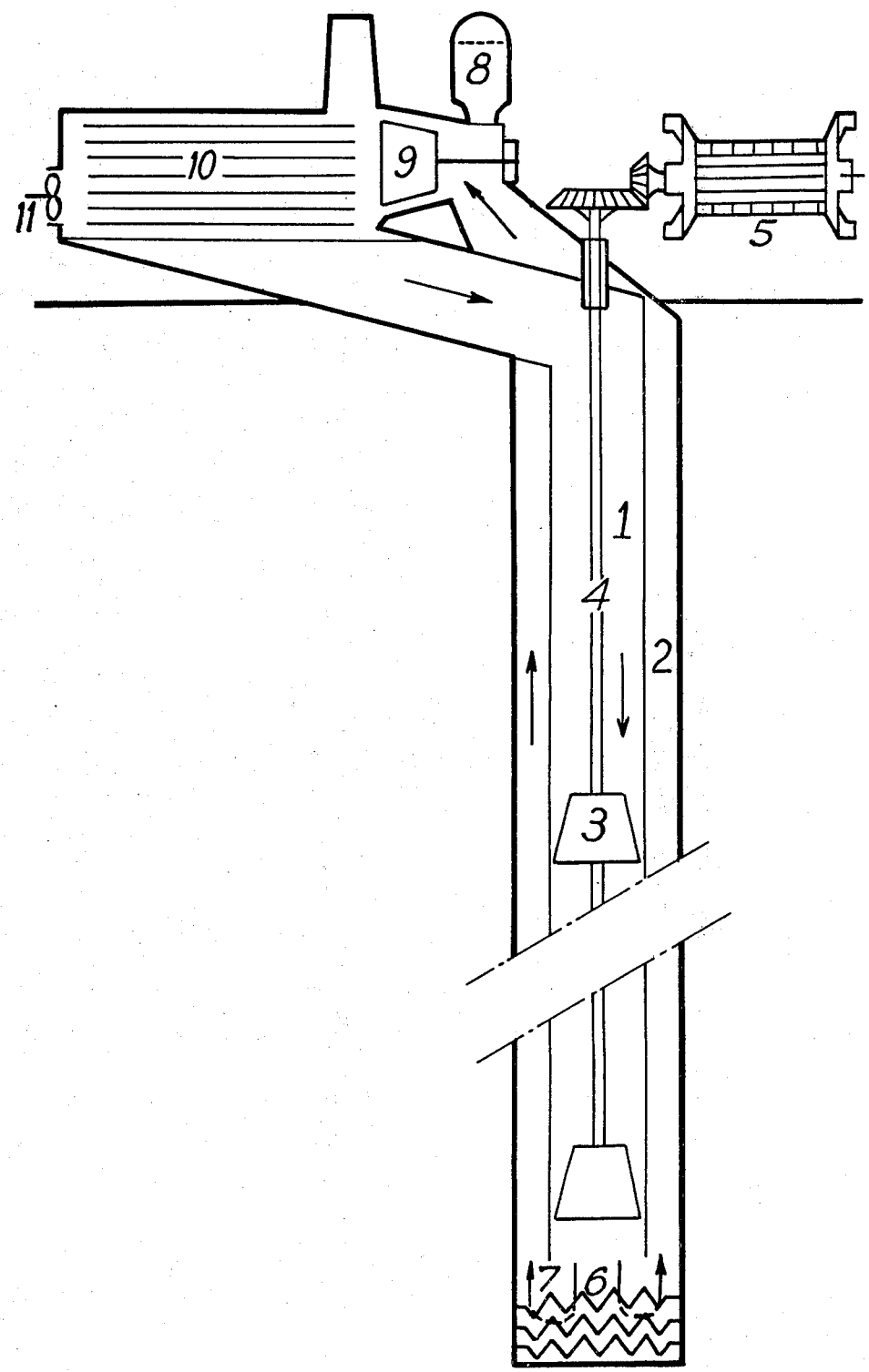

PRODUCTION OF INDUSTRIAL ELECTRICAL ENERGY FROM HYDRAULIC ENERGY

BACKGROUND OF THE INVENTION

The present invention relates to the production of industrial electrical energy from hydraulic energy.

SUMMARY OF THE PRIOR ART

The conventional production of electrical energy depends on several sources: thermal power stations employing coal or oil, having a mediocre yield since they function in accordance with Carnot's principle and the difficulties of supplying them are known; nuclear power stations which follow the same principle, consume a fossil fuel and present the danger of radio-active pollution; hydro-electric power stations which are non-polluting and of high yield, represent only a small proportion of the production and their network of implantation is reaching saturation point.

The other sources of energy envisaged: wind, tide, sun, are not in a position to satisfy the demand due to their irregularity or dilution.

Only geothermics do not present these drawbacks, but this remains a domain which is little exploited and experiments which have been attempted once again resort to the principles and yields of thermodynamics, this calling considerable quantities of heat into play. This is why only very localised deposits are exploited.

SUMMARY OF THE INVENTION

It is an object of the present invention to overcome the above mentioned constraints and more particularly to liberate the production of electrical energy from the laws of thermodynamics.

The process of the invention, of the type employing a fluid brought to saturating vapour phase in a substantially vertical column, at the upper part of which the fluid is returned to liquid phase before being directed towards a fall column which it takes to return to the lower part of the first column where vaporization takes place and to actuate, between these two levels and within the fall column, at least one energy-producing member, is characterised in that a temperature is arranged to prevail in the vapour column which enables the vapour to be maintained close to its critical point.

BRIEF DESCRIPTION OF THE DRAWINGS

The single FIGURE shows a schematic view of an installation for carrying out the invention.

DESCRIPTION OF THE PREFERRED EMBODIMENT

The process of the invention is based on the properties of the saturating vapours: "at equal temperature, the pressure of a saturating vapour is independent of the volumes of vapour", and which may be expressed by "Pressure P=constant". Furthermore, the saturating vapour occupies the whole volume allocated thereto; a saturating vapour column several thousands of m high may thus be designed (which is already produced for certain conventional geothermic installations). Finally, "at equal temperature, there is no vapour at a pressure greater than its saturating pressure". It is therefore in equilibrium with its generator fluid and it may easily be condensed by communicating an over pressure thereto. However, condensation liberates calories which must be evacuated for the conversion to be permanent. In fact, under the same conditions, the changes in state are characterised by inverse and equal thermic phenomena: exothermic phenomena during condensation and endothermic during vaporisation. The quantities of heat called into play vary with the nature of the fluid and the temperature at which these changes of state are made. They are given by the equation:

$$Q = mc(t-t') + mL$$

in which Q is the quantity of heat which appears in Kcal, m is the mass of the fluid in Kg, c is the heat-to-weight ratio of this fluid in Kcal/kg at the temperature in question, (t−t') represents the difference in temperature undergone by the fluid in °C. and L is the latent heat of vaporisation (or of liquefaction) at the temperature of the experiment in Kcal/kg. Now, it is known that for liquids, this latent heat of vaporisation is zero when their critical point is reached.

The invention proposes to condense a saturating vapour close to its critical point, to centrifuge the condensed liquid, benefitting from a high fall, then to vaporize this same liquid again by reheating it artificially up to its critical point so that it restarts its cycle. In these conditions, an artificial fall in closed circuit is effected whilst maintaining the system in equilibrium.

The heat to be supplied adversely influences the energetic balance of the system, however, for a given installation, whatever the conditions in which the changes of state are made, the energetic balance forcibly becomes positive from a certain fall, since the hydraulic energy collected is proportional thereto. Thus, the system is liberated from the thermodynamic yield and this is the gist of the invention.

The carrying out of the process of the invention may advantageously be envisaged by means of an installation of the geothermic type for which the heat exchange with the ambient medium, i.e. in this case the surrounding earth, have been calculated and estimated negligible after a relatively short starting period. It could virtually be considered that the system then develops in a critical ambient medium. In this hypothesis, there would be co-existence everywhere of the liquid phase and the vapour phase. Now, in the case of the invention, separate states must be permanently maintained and a temperature difference must therefore be provided in order to differentiate the liquid-vapour phases. This difference will be the smaller as the capacity of liquefaction of the installation will be large, which will determine the average rate of flow of the liquid directly connected with the hydraulic energy collected.

Taking into account the nature of the liquid used, the power of the heating necessary during vaporization remains acceptable. It may be varied and the minimum heating may be adopted during normal functioning of the installation. However, the power actually installed exceeds fairly widely that of the normal functioning and could obviate a cooling of the chamber (due to a phreatic movement of water for example).

The vapour is in the presence of its generator liquid, it is therefore saturating and fills its pipe by itself if only its saturating tension is maintained. Due to its properties, it accomplishes its rise itself. It consequently represents a potential energy much superior to its enthalpy; its liquefaction prevents the tension from increasing in the vapour chamber and consequently vaporisation may continue.

The drilling diameter is about 2 m and its depth 3000 m. In these conditions, for an average heat gradient of 1° C./30m and a temperature at phreatic level of 12° C., the temperature of 112° C. at the bottom of drilling is attained. This is the critical temperature of Dichloro-difluoro-methane (CF2 CL2) or "Freon 12" used in the installation. It presents critical constants such that its carrying out should not raise new technological problems;

Pressure: 40.879 kg/cm²
Volumetric mass: 558 kg/m³
Specific heat: 1.1 Kcal/kg

Its volumetric mass increasing rapidly when the temperature reduces, we have adopted 568 kg/m³ as average value. Its latent heat of vaporisation is very low (in fact it is a cold-producing fluid) and the volumetric mass of its critical saturating vapour is important: 557.59 kg/m³. Several derivatives of the methane named "Freon" exist, which present characteristics similar to those described but different critical points. Different depths of drilling may thus be envisaged. A fluid specific of the invention should be able to be created, of which the qualities would be better than those of the "Freon".

The single FIGURE represents an installation which will be described hereinafter. As it is possible in practice to act on the temperature and pressure, it has not appeared necessary to specify further the data given hereinafter. Similarly, certain factors have been neglected such as the acceleration of fall with the depth, the final influence of which is little.

The installation is composed of a pipe 1 and a concentric annular pipe 2, this assembly enabling only one drilling to be made. These pipes are constituted by superposable elements, for example twelve of which comprise a pre-installed and dismountable hydraulic turbine 3. In fact, one may intervene on any element of the forced pipe by dismantling it piece by piece from the surface, after having emptied the circuit by evacuating the liquid at the outlet of a liquefactor 10 and by lowering the pressure inside the pipe 2. The turbines are stepped every 250 m in order to avoid too high a hydraulic pressure. They are connected together by a shaft 4 which transmits their torque to an alternator 5 on the surface; they also serve as bearings for this shaft and operate substantially in the same conditions, Bernouilli's equation $v=\sqrt{2gh}$ makes it possible to estimate that the velocity of the fluid would attain 70 m/s for a height of 250 m. The average speed of flow of the liquid is maintained at 8 m/s by the presence of the turbines. In this pipe 1, the liquid is always under supracritical pressure conditions, it is subjected to the effect of the compressor 9 which takes its internal pressure (piezometric height) to 41.879 kg/cm², then its absolute pressure increases along the pipe under the effect of the height of the liquid (fall) to reach its maximum value: 56.079 kg/cm² upstream of each hydraulic turbine. The hydraulic pressure (due to the height of the liquid) is then 14.2 kg/cm². The piezometric height (specific energy of pressure of the liquid) is not taken into account, although said liquid undergoes an expansion when it arrives in the vaporization chamber 7; nor is its kinetic energy taken into account. These two forms of energy dissipate in the chamber 7, promoting vaporization.

In fact, all that is considered is the permanent flow of a liquid under the sole action of the force of gravity in the calculation of the energetic balance of the system.

The temperature of the liquid at the outlet of the liquefactor 10 is 110.5° C., lower by 1.5° C. than its critical temperature. The central pipe 1, with an outer diameter of 1.323, delivers 10.618 m³ per second of liquid for an average velocity of 6 m/s. Taking into account the diameter of the transmission shaft 4, or 0.25 m, this rate of flow is equivalent to a weight of 6031.3545 kg/s. The pipe 1 is therefore considered as an annular pipe also and the total pressure drops have been assessed at 150 m height of liquid "Freon 12". Despite the very low viscosity of the liquid, the yield of the hydraulic turbines is estimated at 85%, taking into account the particular characteristics of the fluid conveyed.

The mechanical energy collected appears in this case to be 17 189 360 kgm/s, or 143.33 MWe. If account is taken of the fact that the mechanical losses due to friction and mixing of the liquid are converted almost totally into heat, it is seen that the power of the heating 6 may be considerably reduced. In fact, the increase in temperature of the liquid would then be about 1.09° C. and its temperature 111.59° C. at the outlet of the last turbine. The heating 6 installed in the vaporisation chamber 7 necessitates $$Q=mc(t-t')+mL,$$

or:

$$Q=6\ 031.3545\times1.1(112-111.59)+0=2720.14$$
Kcal/s, or an electrical power of 11.37 MW. In fact, a power of 25 MW is provided, this making it possible to envisage that in practice a certain latent heat of vaporization remains (up to 493 cal/kg) or to obviate a possible cooling. If the pressure in the vaporization chamber 7 and in the annular pipe 2 is maintained at 40.879 kg/cm² by means of the pressurizer 8, the liquid can vaporize only at its critical temperature (112° C.) and the latent heat of vaporization is therefore zero. However, in practice, to clearly differentiate the liquid-vapour phases, a pressure may be made to prevail which is very slightly lower than that of the theoretically envisaged maximum saturating pressure. Consequently, a certain amount of latent heat will be called into play. In normal functioning, the pressure and temperature values will be maintained as close as possible to the critical point to obtain a maximum yield.

At the outlet of the last turbine, the liquid conserves a considerable kinetic energy (=8 m/s) and comes into contact with the heating elements 6 which take it to its critical temperature whilst it expands to its maximum saturating pressure and vaporizes. The saturating vapour fills the annular pipe 2 up to compresser 9 which communicates thereto a relative overpressure of 1 kg/cm² in the elements of the liquefactor 10 where the liquid undergoes a cooling of 1.5° C. The liquefied fluid is then directed onto the central pipe 1 to be centrifuged again.

The annular pipe 2 presents a surface equal to that of pipe 1, this determining substantially equal speeds for the two fluids (28.8 km/h). The total mass of the "Freon 12" (liquid+vapour) is about 4500 tons. It should be noted that the vapour may attain a much higher velocity, this enabling both the outer diameter of its pipe and the total mass of the "Freon 12" to be reduced.

The compresser 9 theoretically absorbs a power of:

$$N_{(cv)}=Q\gamma H/75=141.53\text{ cv or }104.166\text{ Kw}$$

(cv = horse power)

Its operation will in fact be more important since the density of the liquid increases during its cooling (variation of volume), this also implying that the velocity of the vapour is slightly greater than 8 m/s. Its operation will be adjusted to that of the fan 11 (in the case of cooling by air) to determine a maximum rate of flow of the liquefactor. Even if it has a poor mechanical yield, its consumption is almost negligible.

The control and regulating apparatus, the filtering and regeneration devices will only sightly influence the overall yield of the system.

The final production of the power station will therefore be between 120 and 130 MWe.

What is claimed is:

1. A process for the production of electrical energy from a fluid circulating in a closed circuit and comprising the steps of bringing said fluid to its saturating vapour phase in a substantially vertical column, returning said fluid to its liquid phase at the upper portion of said column, directing the liquid phase fluid downward through a fall column to return said fluid to the lower portion of said vertical column, vaporizing said fluid at said lower portion of said vertical column, and actuating at least one energy-producing member with said fluid in said fall column, said at least one energy-producing member being disposed in said fall column between said upper and lower portions, said process being characterized by maintaining the temperature in said vertical column such that the vapour phase of said fluid is close to its critical point.

2. The process of claim 1, wherein the temperature of the vapour close to the critical point is maintained by a heating source.

3. The process of claim 1 wherein the closed circuit for said circulating fluid is disposed in an ambient medium, and said temperature is initially attained in said vertical column such that said vapour phase of said fluid is close to its critical point by removing heat from said ambient medium.

4. An installation for producing electrical energy from a fluid circulating in a closed circuit, comprising a vapour column, a vaporization chamber disposed at the lower portion of said vapour column, a liquefactor disposed at the upper portion of said vapour column, a fall column connecting said liquefactor and said vaporization chamber, energy-conversion means positioned in said fall column, energy-producing means driven by said energy-conversion means, and heating means disposed in said vaporization chamber for maintaining the temperature in said vapour column such that the fluid in said vapour column is in its vapour phase close to its critical point.

5. The installation of claim 4, wherein the vapour and fall columns are concentric.

6. The installation of claim 4 further comprising means disposed in the vapor column for pressurizing said vapor column, compressor means situated between said pressurizing means and said liquefactor and wherein said liquefactor comprises a cooling means.

* * * * *